Patented July 6, 1954

2,683,131

UNITED STATES PATENT OFFICE 2,683,131

ACIDIC POLYESTER-ETHOXYLINE RESINOUS COMPOSITIONS

William E. Cass, Schenectady, N. Y., assignor to General Electric Company, a corporation of New York No Drawing. Application October 31, 1951, Serial No. 254,207

15 Claims. (Cl. 260—45.4)

This invention is concerned with novel resinous compositions of matter. More particularly the invention relates to a composition of matter comprising (1) an acidic low molecular weight polyester containing free carboxyl groups and comprising the product of reaction of a mixture of ingredients comprising a polyhydric alcohol and a non-polymerizable (i. e. free of polymerizable ethylenic unsaturation) dicarboxylic acid and (2) a complex epoxide resin comprising a polyether derivative of a polyhydric organic compound, e. g., a polyhydric alcohol or phenol, containing epoxy groups, which for brevity will hereinafter be referred to as an "ethoxyline resin."

It has been disclosed in U. S. Patent 2,324,483—Castan that epoxy resins comprising the product of reaction of a phenol having at least two phenolic hydroxy groups and an epihalogenohydrin, e. g., epichlorohydrin, in which the said product contains at least two ethylene oxide groups, may be converted to the substantially thermoset stage by employing a polybasic carboxylic acid or anhydride, for instance, phthalic anhydride, as a cure accelerator. The resinous reaction products with which the polybasic carboxylic acid anhydride is employed are generally complex resins comprising a polyether derivative of a polyhydric phenol containing epoxy groups and are commonly known as "ethoxyline resins" and are sold under the trade name of Epon or Araldite resins. Although the use of these polybasic carboxylic acids or anhydrides gives useful products, nevertheless, there are certain disadvantages inherent in using such materials. In the first place, the shelf life of the partially reacted mixture of the ethoxyline resin and the polybasic carboxylic acid or anhydride is unsatisfactory and after relatively short periods of time it is found that the mixture tends to advance in its state of cure so that ultimately if not employed within a reasonable time after addition of the acid or anhydride, the mixture becomes useless for most applications. As a further disadvantage of the use of these anhydrides as cure accelerators, it is found that when incorporated in the ethoxyline resin, and the mixture is used in the form of thin films, there is a great tendency to lose the cure accelerator by vaporization when the films are heated at elevated temperatures of the order of from 150° to 200° C. which are the temperatures generally required to effect curing of the film. This loss of the cure accelerator results in a variable composition and impaired physical properties in the cured resin.

I have now discovered that mixtures of the aforementioned ethoxyline resins may be prepared which are eminently useful in many applications and which have properties which are superior to the properties of mixtures of ethoxyline resins heretofore prepared and used for the same purpose. More particularly, I have found that the combination of an ethoxyline resin together with an acidic polyester containing at least two free carboxyl groups and comprising the product of reaction of a mixture of ingredients comprising a polyhydric alcohol and a non-polymerizable (i. e., free of polymerizable ethylenic unsaturation) dicarboxylic acid has properties which obviate all the difficulties heretofore encountered using a polybasic carboxylic acid or anhydride as the cure accelerator for the ethoxyline resin. The mixture of the acidic polyester and the ethoxyline resin, even in the partially reacted state, can be stored at room temperature for periods as long as six months, and at the end of this time they will be found to be still soluble and fusible whereas resins prepared from the ethoxyline resin using the anhydrides alone as the cure accelerator were substantially insoluble and infusible in less than 31 days at room temperature. Moreover, resinous compositions prepared in accordance with my invention are less brittle, and appear to be tougher.

The acidic low molecular weight polyetsers employed in the practice of this invention which comprise the product of reaction of a mixture of ingredients comprising a polyhydric alcohol and a non-polymerizable dicarboxylic acid or anhydride, are not to be confused with the usual type of resins commonly known as "alkyd resins." The usual alkyd resins contain unreacted hydroxyl groups in a concentration approximately equivalent to the concentration of unreacted carboxyl groups. In contrast to this, the acidic polyesters employed in the practice of my invention are formulated with an equivalent excess of carboxyl groups. Since these polyesters are reacted essentially to completion, few if any hydroxyl groups remain unreacted. The excess carboxyl groups remain unreacted but attached to the polyester molecules. As a further result of the use of an equivalent excess of carboxyl groups in formulating these polyesters, these polyesters have in general considerably higher acidity (i. e., higher acid numbers or lower acid equivalent weights) than the usual alkyd resins. Thus the usual alkyd resins have acid numbers of the order of from nearly zero to around 30 to 50. Glyceryl phthalate alkyd resins, although having higher acid numbers, are unsuitable because of the undesirably large concentration of free hydroxyl groups. The polyesters employed in the present invention have acid numbers above 150.

The use of usual alkyd resins in place of my acidic polyesters with the ethoxyline resins will not give equivalent results Thus, when a con-

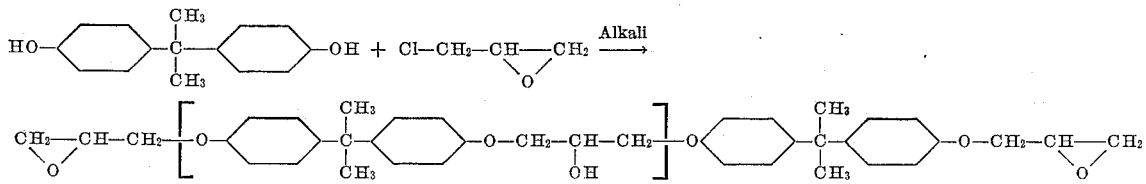

ventional ethylene glycol phthalate resin made from 29.1% ethylene glycol and 70.9% phthalic anhydride which had an acid number of about 38 was mixed with an ethoxyline resin, it was found that attempts to cure such a mixture were generally unsuccessful and the heating of such a mixture, for instance, at 150° C. for 18 hours, still gave a fluid composition. Also, a conventional glyceryl-phthalate resin made from 29.2% glycerol and 70.8% phthalic anhydride having an acid number of about 125 when mixed with an ethoxyline resin gave a mixture which was not completely homogeneous. Heating of this mixture for 15 hours at 125° C. gave a cheezy gel in which it appeared that the glyceryl-phthalate resin was a gel by itself leaving some unpolymerized ethoxyline resin.

In the preparation of the acidic, low molecular weight polyesters, various polyhydric alcohols may be employed. Among such alcohols may be mentioned, for example, ethylene glycol, diethylene glycol, propylene glycol, glycerol, pentaerythritol, etc. Examples of non-polymerizable dicarboxylic acids which may be used in making the aforesaid polyesters are, for instance, succinic, adipic, sebacic, phthalic, isophthalic, terephthalic, chlorinated phthalic acids, etc. Where desired or possible, anhydrides of the aforesaid acids may be employed with equal effect. For purposes of brevity, the term "dicarboxylic acid" herein employed is intended to include not only the acid per se but anhydrides of the aforesaid acids which are capable of preparation.

The ethoxyline resins defined above as being a complex epoxide resin comprising a polyether derivative of a polyhydric organic compound containing epoxy groups are disclosed in various places in the art Among such references may be mentioned the aforesaid Castan Patent 2,324,483, as well as Castan Patent 2,444,333, British Patent 518,057, and British Patent 579,698. For the most part these ethoxyline resins are based on the resinous product of reaction between an epihalogenohydrin, for instance, epichlorohydrin, and a phenol having at least two phenolic hydroxy groups, for example, bis-(4-hydroxyphenyl) dimethylmethane. U. S. Patents 2,494,295, 2,500,600, and 2,511,913 also described examples of ethoxyline resinous compositions which may be employed in the practice of the present invention. By reference, the aforementioned patents are intended to be part of the present description of the ethoxyline resins used and, for brevity, the ethoxyline resins will not be described other than that they contain more than one ethylene oxide group, e. g., from 1 to 2 or more epoxide groups, per molecule, and may be prepared by effecting reaction between a polyhydric phenol or alcohol, for example, phenol, hydroquinone, resorcinol, glycerine, and condensation products of phenols with ketones, for instance, bis - (4 - hydroxyphenyl) - 2,2-propane, with epichlorohydrin. For example, the reaction of epichlorohydrin with bis-(4-hydroxyphenyl)-2,2-propane may be formulated as follows:

where $n$ has an average value varying from around zero to about 7. Many of these ethoxyline resins are sold under the name of Epon resins by Shell Chemical Corporation, or Araldite resins by the Ciba Company. Data on the Epon resins are given in the table below:

TABLE I

| Epon No. | Epoxide | Approximate Esterification Equivalent | M. P., °C. |
|---|---|---|---|
| RN-34 | 225-290 | 105 | 20-28. |
| RN-48 | 192 | 80 | 9. |
| 1064 | 300-375 | 105 | 40-45. |
| 1062 | 140-165 |  | Liquid. |
| 1004 | 905-985 | 175 | 97-103. |
| 1007 | 1600-1900 | 190 | 127-133. |
| 1009 | 2400-4000 | 200 | 145-155. |
| 1001 | 450-525 | 130 | 64-76. |

The complex epoxides used with the above-described acidic polyesters contain epoxide groups or epoxide and hydroxyl groups as their functional groups and are generally free from other functional groups such as basic and acidic groups.

Various methods may be used to prepare the highly acidic low molecular weight non-polymerizable polyesters employed with the ethoxyline resins. In order to obtain the highly acidic polyesters it is essential that the dicarboxylic acid or anhydride be employed in an equivalent excess over the polyhydric alcohol. Thus, in the case of a dihydric alcohol, I advantageously employ for each mol of dihydric alcohol, from about 1.1 to 2.0 preferably from 1.5 to 2.0, mols of the dicarboxylic acid. In the case of the use of trihydric alcohols, for example, glycerine, it has been found that for each mol of glycerine, from about 2.2 to 3 mols, preferably from 2.5 to 3.0 mols, of the dicarboxylic acid, for example, phthalic acid or anhydride, may be used. When using tetrahydric alcohols such as pentaerythritol, I have found it advantageous to use from about 3.3 to 4.0 mols of the dibasic acid per mol of tetrahydric alcohol.

In preparing the polyesters it is desirable for many applications that the acid number of the polyesters exceed about 150, preferably in excess of 200. These polyesters may be prepared generally by heating a mixture of the polyhydric alcohol and the dicarboxylic acid or anhydride in the proper molar concentrations at elevated temperatures of the order of from about 150° to 250° C. for a period of time ranging from about 1 to 3 or more hours. Reaction is preferably conducted until the acid number is within the desired range, and most of the hydroxyl groups have been esterified so as to give the highly acidic low molecular weight polyesters required for use with the ethoxyline resins. The examples below indicate various manners in which the highly acidic polyesters may be prepared and it is believed that persons skilled in the art will have no difficulty in determining the method of preparing these acidic polyesters.

The proportion of polyester and ethoxyline resin employed may be varied within limits depending on the application for which the mixture is intended, the type of polyester used, the type of ethoxyline resin employed, etc. Generally, I prefer to use the acidic polyester in an amount ranging from about 5 to 70 per cent, of the total weight of the ethoxyline resin and the acidic polyester, the actual proportion of ingredients depending upon the specific acidic polyester and ethoxyline resin employed. I prefer to employ the polyester and ethoxyline resins in such proportions that there is present in the mixture from approximately 0.8 to 1.2 polyester acid equivalents for each equivalent of epoxide.

The method by which the acidic polyester and the ethoxyline resins may be combined can of course be varied and presents no particular difficulty. Generally, it is desirable to heat the polyester resin and while in a fluid condition to add the ethoxyline resin (also heated if necessary to a fluid state) and thereafter heat the mixture of ingredients with stirring at a temperature ranging, for example, from about 80° to 150° C. or higher until a homogeneous composition is obtained. Further heating at elevated temperatures ranging, for instance, from 100 to 200° C. of the aforesaid homogeneous composition results in transformation of the mass to a solid, infusible, insoluble resin. Thus, the homogeneous composition while still fluid can be poured into a mold and by further heat treatment can be converted to a solid thermoset casting with little shrinkage and without the evolution of appreciable amounts of by-products, such as water. Alternatively, the reaction between the ethoxyline resin and the acidic polyester can be interrupted by cooling the aforesaid fluid homogeneous composition to room temperature giving a fusible, soluble resin in an intermediate state of condensation having good shelf life. It will of course be apparent to those skilled in the art that the rate of intercondensation will be accelerated as the heating temperature is increased and that the length of time at any one temperature will also affect the degree of condensation. This partially reacted composition can be subsequently employed in such applications as casting, molding, laminating, or surface coating, or for adhesive purposes (using solutions thereof if necessary. Subsequent heating of the partially reacted precondensed composition results in its conversion to the insoluble, infusible, cured state.

In order that those skilled in the art may better understand how the present invention may be practiced, the following examples are given by way of illustration and not by way of limitation. All parts are by weight.

*Example 1*

An ethylene glycol adipate polyester was prepared by heating 36.5 grams (0.25 mol) adipic acid with 10 grams (0.16 mol) ethylene glycol for 1.5 hours at 182–250° C. The product, which was a semi-crystalline paste at room temperature, had an acid number of about 252. If 100% reaction had occurred, the acid number would be 248 (equivalent weight 226). If no reaction had occurred, the acid number would be 603. The above-prepared acidic polyester was mixed with two different ethoxyline resins by mixing the ingredients at a temperature of about 150° C., and thereafter the mixture was cured by heating it for about 15 hours at 150° C. For comparison, samples were also prepared using in place of the acidic polyester described above an equivalent amount of adipic acid (acidity basis). The following table shows the proportions of materials employed together with properties of the polymer obtained as a result of the heating operation at 150° C.

TABLE II

| Sample No. | Parts Acidic Polyester | Parts Epon RN-34 | Parts Epon 1062 | Parts Adipic Acid | Properties of Polymer |
|---|---|---|---|---|---|
| 1 | 10 | 20 | | | Tough, firm polymer. |
| 2 | 20 | | 30 | | Tough polymer somewhat softer than Sample No. 1. |
| 3 | | 20 | | 3.3 | Hard, brittle, weak polymer. |
| 4 | | | 30 | 6.6 | "Short" polymer, weaker than Sample No. 2. |

It will be clearly apparent from the foregoing table that the use of the acidic polyesters in place of the dicarboxylic acid itself gives polymers with the ethoxyline resins which are tougher and more resilient. Because of this the compositions comprising acidic polyesters and ethoxyline resins are useful as potting compositions.

*Example 2*

An ethylene glycol phthalate acidic polyester was prepared by heating 37 grams (0.25 mol) phthalic anhydride and 10 grams (0.16 mol) ethylene glycol for 1.5 hours at 186–210° C. The product was a viscous balsam-like material at room temperature of an acid number of about 235. In the preparation of this polyester some water was evolved through reaction of the acidic phthalate ester formed initially with hydroxyl groups from the ethylene glycol. Evidence for this was found in the fact that the calculated acid number for 100% reaction is 220 and for 0% reaction (of acid phthalate structure) 298. The above-prepared acidic polyester was used to make homogeneous compositions by mixing it with two different ethoxyline resins by heating the mixture at 150° C. until a homogeneous mixture was obtained. Thereafter, the mixture was further heated at about 150° C. for approximately 15 hours. For comparison the same ethoxyline resins were treated similarly with phthalic anhydride. The amount of phthalic anhydride used in each case was calculated so that the total amount of acidity introduced into the system was approximately equivalent to that furnished by the polyester. The mixtures were heated in the same manner. The following Table III shows the proportions of ingredients employed together with the properties of the polymers obtained.

TABLE III

| Sample No. | Parts Acidic Polyester | Parts Epon RN-34 | Parts Epon 1062 | Parts Phthalic Anhydride | Properties of Polymer |
|---|---|---|---|---|---|
| 5 | 10 | 20 | | | Hard, brittle resin. |
| 6 | 20 | | 30 | | Tough, soft resin. |
| 7 | | 20 | | 3.1 | Hard, brittle resin. |
| 8 | | | 30 | 6.2 | Soft, "short" gel, weaker than Sample No. 6. |

Example 3

An acidic pentaerythritol phthalate was prepared by heating together about 592 grams (4.0 mols) phthalic anhydride and 143 grams (1.05 mols) pentaerythritol for 30 minutes at 175°–210° C. until an acid number of about 336 and a neutralization equivalent of 167 was obtained. Castings were made from this polyester together with two ethoxyline resins, namely, Epon 1064 and Epon 1001 in the following proportions:

TABLE IV

| Sample No. | Parts Acidic Polyester | Parts Epon 1064 | Parts Epon 1001 |
|---|---|---|---|
| 9 | 30 | 70 |   |
| 10 | 20 |   | 80 |

The castings in each case were heated for about 15 hours at 125° C. and additionally for about 1.5 hours at 150° C. The castings obtained were yellow-brown resins, fairly hard and tough at 150° C. and very hard and impact-resistant at room temperature.

A precondensed resin was prepared by heating 30 parts of the pentaerythritol-phthalate polyester with 70 parts of Epon 1064 for 15 minutes at 120–125° C. The product had an acid number of 74.8 indicating about 26% reaction of acid groups and a film cure time at 200° C. of about 40 seconds.

Example 4

In this example, 1480 grams (10 mols) phthalic anhydride and 330 grams (3.6 mols) glycerine were placed in a reaction vessel equipped with a mechanical stirrer and air-cooled reflux column. The reaction mixture was heated gradually to 190° C. and then for one-half hour at 190–206° C. The resulting aqueous distillate was collected and removed to leave a resin which had an acid number of about 354 corresponding to an acid equivalent weight of 158. Since as shown above Epon 1064 has an epoxide equivalent of 300–375 (340 average) and the acidic glyceryl phthalate polyester has an equivalent weight of 158, on the basis of the reaction of one carboxyl group with one epoxide group, as shown below,

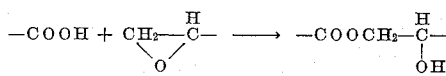

the following calculations can be made:

Epon 1064 _____ 340— 68%
Glyceryl phthalate acidic polyester__ 158— 32%
                                     ———  ———
                                     498—100%

The preferred ratio of reactants is approximately at the equivalence point, that is, 30–33% glyceryl phthalate acidic polyester.

Example 5

An acidic polyester was prepared by heating 438 grams (3.0 mols) adipic acid and 92 grams (1.0 mol) glycerol at 190–210° C. for two hours in an inert atmosphere. The acidic polyester thus obtained had an acid number of 390. The aforesaid acidic polyester and Epon 1004 in a weight ratio of 20 to 80 were dissolved in acetone to make a 20 percent solids solution. This solution was then used to impregnate and coat mica paper tape, the manner for preparing such mica paper being more particularly described in Bardet Patent 2,549,880, issued April 24, 1951. The resultant treated tape was used to wrap stator bars which were then molded at a temperature of about 150° C. and a pressure of 100 p. s. i. for several hours to induce reaction between the ethoxyline resin and the acidic glyceryl adipate polyester. The resultant insulation was thermoset, tough and compact, and showed excellent dielectric strength. The combination of the glyceryl adipate acidic polyester with ethoxyline resins for use with mica paper, which in turn is to be used as insulation for stator bars, is more particularly disclosed and claimed in the copending application of Charles D. Richardson and Algerd F. Zavist, Serial No. 254,128, filed concurrently herewith and assigned to the same assignee as the present invention.

For preparing castings, about 30 parts of the above-prepared acidic glyceryl phthalate resin (Example 4) was heated to 100° C. and thereafter was mixed with 70 parts Epon 1064 which was also heated. The resulting mixture was then heated with stirring to about 125° C. until a homogeneous composition was obtained and poured into a mold and further cured in the mold about five hours at 150° C. The mixture polymerized to a clear amber-colored resin showing little shrinkage. The product was hard and tough at 150° C. and was very hard and impact-resistant at room temperature.

If the reaction mixture of the Epon 1064 and the acidic glyceryl phthalate polyester is heated for a short time and then cooled quickly before gelation has a chance to occur, precondensed resins showing promise as surface coatings, adhesives, and binders are obtained. This procedure is more particularly described as follows. About 30–33 parts of the glyceryl phthalate acidic polyester described in Example 4 and 67–70 parts of an ethoxyline resin (Epon 1064) were preheated to 100–120° C., mixed with stirring until a homogeneous mixture was obtained and then further heated at 120–130° C. for about 20–30 minutes. The reaction was slightly exothermic so that some moderation in temperature is necessary with large batches. At the end of the reaction period the viscous product was poured on a clean surface to cool the mixture quickly and thus "quench" the reaction. By this method it is possible to obtain heat-curable compositions of matter which show film cure times at 200° C. of periods ranging from about 80 to 195 seconds, depending on the temperature at which precondensation takes place, the length of time at which precondensation is conducted, the percent by weight of the glyceryl phthalate acidic polyester, etc.

The compositions of matter herein described have utility in many applications. Thus, various useful solutions of the unreacted mixtures of the acidic polyesters and the ethoxyline resins or precondensed resins derived therefrom may be prepared by using different low-boiling solvents. Such solvent materials are, for example, acetone, cyclohexanone, methyl ethyl ketone, etc., to which aromatic diluents such as benzene, toluene, etc. can be added. When solutions of the mixture of resins or precondensed resins are prepared, the solutions may be used as surface coatings, as adhesives, as impregnating agents for various sheet materials including sheets of cloth, paper, asbestos, mica, etc. Laminated products may be prepared by treating the sheet material with the solution of the mixture of the ethoxyline resin and the acidic polyester or precondensed resins thereof, and evaporating substantially all the solvent and thereafter superposing the sheets upon each other and molding the assembly under heat and pressure for a time sufficient to cure the laminated product. In such instances, temperatures of the order of about 150° to 200° C. for times ranging from about ¼ to 6 hours are advantageously used.

Various molded products may also be prepared using the mixture of resins or precondensed resins prepared from the mixture of resins and adding a filler to the mixture at an elevated temperature. If desired, the filler may be placed in a solution of the mixture of resins or precondensed resins and the solvent thereafter evaporated to give a filler material coated with the resins. Among such fillers may be mentioned titanium dioxide, various clays, iron oxide, carbon, graphite, asbestos fibers, etc. The precondensed, i. e., partially condensed mixture of the acidic polyester and the ethoxyline resin, such as Epon 1064, shows shear strengths in excess of 2000 p. s. i. when used as an adhesive for steel or copper oxide-copper coated steel surfaces. In addition, the precondensed resins have been used successfully as a sealant for various surfaces including as a sealant for cracked glass surfaces, particularly bushings which can be reclaimed which otherwise would have to be discarded.

Various magnets may be prepared by which magnetic materials, for instance, Alnico powder, may be mixed with the compositions of matter herein described and molded to give strong pieces which have been found to have breaking strengths of nearly 600 lbs. This is materially in excess of the breaking strength of similar pieces molded using phenolic resins or mixtures of other polymerizable materials and unsaturated alkyd resins as the binders. In the latter two instances, breaking strengths as low as 25 lbs. and generally less than 100 lbs. are usually the order.

From the foregoing examples it is apparent that the properties of the final polymer comprising the acidic polyester and the ethoxyline resin have advantages over those in which only the acid or anhydride is employed with the ethoxyline resin. An inherent advantage of the compositions herein described and claimed lies in the fact that a considerable variation of properties are possible by varying the structure of the polyester, that is, by varying the type of polyhydric alcohol and dicarboxylic acid or anhydride employed, by varying the molecular weight of the polyester, and by varying the ratio of the dibasic acid to polyhydric alcohol and, of course, by varying the acid number. Such variations are not possible when one employs the acid or anhydride itself.

What I claim as new and desire to secure by Letters Patent of the United States is:

1. A composition of matter comprising (1) an acidic low molecular weight polyester having an acid number above 200 and containing free carboxyl groups and comprising the product of reaction of a mixture of ingredients comprising a polyhydric alcohol and a dicarboxylic acid free of polymerizable ethylenic unsaturation and (2) a complex epoxide resin containing epoxy groups and comprising a polyether derivative of a polyhydric organic compound selected from the class consisting of polyhydric alcohols and phenols having at least two phenolic hydroxy groups.

2. A composition of matter comprising (1) an acidic low molecular weight polyester having an acid number above 200 and containing free carboxyl groups and comprising the product of reaction of a mixture of ingredients comprising glycerine and phthalic anhydride and (2) a complex epoxide resin containing apoxy groups and comprising a polyether derivative of a polyhydric organic compound selected from the class consisting of polyhydric alcohols and phenols having at least two phenolic hydroxy groups.

3. A composition of matter comprising (1) an acidic low molecular weight polyester having an acid number above 200 and containing free carboxyl groups and comprising the product of reaction of a mixture of ingredients comprising ethylene glycol and adipic acid and (2) a complex epoxide resin containing epoxy groups and comprising a polyether derivative of a polyhydric organic compound selected from the class consisting of polyhydric alcohols and phenols having at least two phenolic hydroxy groups.

4. A composition of matter comprising (1) an acidic low molecular weight polyester having an acid number above 200 and containing free carboxyl groups and comprising the product of reaction of a mixture of ingredients comprising ethylene glycol and phthalic anhydride and (2) a complex epoxide resin containing epoxy groups and comprising a polyether derivative of a polyhydric organic compound selected from the class consisting of polyhydric alcohols and phenols containing at least two phenolic hydroxy groups.

5. A composition of matter comprising (1) an acidic low molecular weight polyester having an acid number above 200 and containing free carboxyl groups and comprising the product of reaction of a mixture of ingredients comprising pentaerythritol and phthalic anhydride and (2) a complex epoxide resin containing epoxy groups and comprising a polyether derivative of a polyhydric organic compound selected from the class consisting of polyhydric alcohols and phenols containing at least two phenolic hydroxy groups.

6. A composition of matter comprising (1) an acidic low molecular weight polyester having an acid number above 200 and containing free carboxyl groups and comprising the product of reaction of a mixture of ingredients comprising glycerine and adipic acid and (2) a complex epoxide resin containing epoxy groups and comprising a polyether derivative of a polyhydric organic compound selected from the class consisting of polyhydric alcohols and phenols containing at least two phenolic hydroxy groups.

7. A composition of matter obtained by heating until an intercondensed product is obtained a mixture of ingredients comprising (1) an acidic low molecular weight polyester having an acid number above 200 and containing free carboxyl groups and comprising the product of reaction of a mixture of ingredients comprising a polyhydric alcohol and a dicarboxylic acid free of polymerizable ethylenic unsaturation and (2) a complex epoxide resin containing epoxy groups and comprising a polyether derivative of a polyhydric organic compound selected from the class consisting of polyhydric alcohols and phenols containing at least two phenolic hydroxy groups.

8. A composition of matter comprising an intercondensed product obtained by heating until intercondensation has taken place, a mixture of ingredients comprising (1) an acidic low molecular weight polyester having an acid number above 200 and containing free carboxyl groups and comprising the product of reaction of a mixture of ingredients comprising glycerine and phthalic anhydride and (2) a complex epoxide resin containing apoxy groups and comprising a polyether derivative of a polyhydric organic compound selected from the class consisting of polyhydric alcohols and phenols containing at least two phenolic hydroxy groups.

9. A composition of matter comprising the intercondensed product obtained by heating until intercondensation has taken place, a mixture of ingredients comprising (1) an acidic low molecular weight polyester having an acid number above 200 and containing free carboxyl groups and comprising the product of reaction of a mixture of ingredients comprising ethylene glycol and adipic acid and (2) a complex epoxide resin containing epoxy groups and comprising a polyether derivative of a polyhydric organic compound selected from the class consisting of polyhydric alcohols and phenols containing at least two phenolic hydroxy groups.

10. A composition of matter comprising the intercondensed product obtained by heating until intercondensation has taken place, a mixture of ingredients comprising (1) an acidic low molecular weight polyester having an acid number above 200 and containing free carboxyl groups and comprising the product of reaction of a mixture of ingredients comprising ethylene glycol and phthalic anhydride and (2) a complex epoxide resin containing epoxy groups and comprising a polyether derivative of a polyhydric organic compound selected from the class consisting of polyhydric alcohols and phenols containing at least two phenolic hydroxy groups.

11. A composition of matter comprising the intercondensed product obtained by heating until intercondensation has taken place, a mixture of ingredients comprising (1) an acidic low molecular weight polyester having an acid number above 200 and containing free carboxyl groups and comprising the product of reaction of a mixture of ingredients comprising pentaerythritol and phthalic anhydride and (2) a complex epoxide resin containing epoxy groups and comprising a polyether derivative of a polyhydric organic compound selected from the class consisting of polyhydric alcohols and phenols containing at least two phenolic hydroxy groups.

12. A composition of matter comprising the intercondensed product obtained by heating until intercondensation has taken place, a mixture of ingredients comprising (1) an acidic low molecular weight polyester having an acid number above 200 and containing free carboxyl groups and comprising the product of reaction of a mixture of ingredients comprising adipic acid and glycerine and (2) a complex epoxide resin containing epoxy groups and comprising a polyether derivative of a polyhydric organic compound selected from the class consisting of polyhydric alcohols and phenols containing at least two hydroxy groups.

13. A composition of matter comprising an intercondensed product obtained by heating until intercondensation has taken place, a mixture of ingredients comprising (1) an acidic low molecular weight polyester having an acid number above 200 and containing free carboxyl groups and comprising the product of reaction of a mixture of ingredients comprising glycerine and adipic acid and (2) a complex epoxide resin comprising a polyether derivative of a polyhydric phenol, containing epoxy groups obtained by reacting bis-(4-hydroxyphenyl)-2,2-propane and epichlorohydrin.

14. The process which comprises (a) forming a mixture of ingredients comprising (1) an acidic low molecular weight polyester having an acid number above 200 and containing free carboxyl groups and comprising the product of reaction of a mixture of ingredients comprising a polyhydric alcohol and a dicarboxylic acid free of polymerizable ethylenic unsaturation and (2) a complex epoxide resin containing epoxy groups and comprising a polyether derivative of a polyhydric organic compound selected from the class consisting of polyhydric alcohols and phenols containing at least two hydroxy groups, and (b) heating the aforesaid mixture for a time and at a temperature sufficient to effect intercondensation between the ingredients.

15. The process which comprises (a) forming a mixture of ingredients comprising (1) an acidic low molecular weight polyester having an acid number above 200 and containing free carboxyl groups and comprising the product of reaction of a mixture of ingredients comprising adipic acid and glycerine and (2) a complex epoxide resin containing epoxy groups and comprising a polyether derivative of a polyhydric organic compound selected from the class consisting of polyhydric alcohols and phenols containing at least two hydroxy groups, and (b) heating the aforesaid mixture for a time and at a temperature sufficient to effect intercondensation between the ingredients.

References Cited in the file of this patent

UNITED STATES PATENTS

| Number | Name | Date |
|---|---|---|
| 2,591,539 | Greenlee | Apr. 1, 1952 |